(12) United States Patent
Mensah et al.

(10) Patent No.: US 9,699,139 B2
(45) Date of Patent: Jul. 4, 2017

(54) COMMUNICATIONS SYSTEM

(75) Inventors: Trevor Mensah, London (GB); Steven Robinson, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1290 days.

(21) Appl. No.: 13/503,482

(22) PCT Filed: Sep. 9, 2010

(86) PCT No.: PCT/GB2010/001709
§ 371 (c)(1),
(2), (4) Date: Apr. 23, 2012

(87) PCT Pub. No.: WO2011/051644
PCT Pub. Date: May 5, 2011

(65) Prior Publication Data
US 2012/0210010 A1   Aug. 16, 2012

(30) Foreign Application Priority Data

Oct. 29, 2009   (EP) ..................................... 09252516

(51) Int. Cl.
*H04L 29/12* (2006.01)
*H04L 29/08* (2006.01)

(52) U.S. Cl.
CPC ...... *H04L 61/256* (2013.01); *H04L 29/12547* (2013.01); *H04L 61/2582* (2013.01);
(Continued)

(58) Field of Classification Search
CPC ... H04L 67/14; H04L 67/24; H04L 29/12547; H04L 61/2582
(Continued)

(56) References Cited

U.S. PATENT DOCUMENTS 6,490,259 B1 * 12/2002 Agrawal et al. ............. 370/331
6,628,943 B1 *  9/2003 Agrawal et al. ........... 455/432.1
(Continued)

FOREIGN PATENT DOCUMENTS

EP        1 788 753        5/2007
WO     WO 01/84812     11/2001

OTHER PUBLICATIONS

International Search Report for PCT/GB2010/001709, mailed Nov. 17, 2010.

*Primary Examiner* — Jimmy H Tran
(74) *Attorney, Agent, or Firm* — Nixon & Vanderhye P.C.

(57) ABSTRACT

A client device (6) may be connected to a network (2) through a private network and one of several connection servers (10, 11, 12, 13) associated with a router (1). In such a configuration a server (5) external to the private network cannot provide a complete routing address for data to be transmitted to the device (6), as it does not have visibility of the control processors (10, 11, 12, 13). To allow such connection to be made, when a connection request for a target client device (6) is transmitted from an external server (5) to the router (1), the router retrieves connection history of the target device (6) from each of the connection servers, and the router 1 then attempts communication with the client device 6 through the connection server (10) reporting the most recent connection.

12 Claims, 6 Drawing Sheets

(52) U.S. Cl.
CPC .............. *H04L 67/14* (2013.01); *H04L 67/24* (2013.01); *H04L 61/2521* (2013.01); *H04L 61/2567* (2013.01)

(58) Field of Classification Search
USPC .................................................. 709/228, 238
See application file for complete search history.

(56) References Cited

U.S. PATENT DOCUMENTS

| | | | |
|---|---|---|---|
| 7,289,815 B2* | 10/2007 | Gfeller et al. | 455/456.1 |
| 8,427,977 B2* | 4/2013 | Workman et al. | 370/254 |
| 2001/0049745 A1* | 12/2001 | Schoeffler | 709/238 |
| 2002/0021689 A1* | 2/2002 | Robbins et al. | 370/352 |
| 2003/0084162 A1* | 5/2003 | Johnson et al. | 709/227 |
| 2008/0062977 A1* | 3/2008 | Kaneko et al. | 370/389 |
| 2010/0322214 A1* | 12/2010 | Workman et al. | 370/338 |
| 2014/0143408 A1* | 5/2014 | Workman et al. | 709/224 |

\* cited by examiner

COMMUNICATIONS SYSTEM

This application is the U.S. national phase of International Application No. PCT/GB2010/001709, filed 9 Sep. 2010, which designated the U.S. and claims priority to EP Application No. 09252516.1, filed 29 Oct. 2009, the entire contents of each of which are hereby incorporated by reference.

BACKGROUND AND SUMMARY

This invention relates to communications systems, and in particular to the connection of client and server devices through a packet-switched communications system.

Network address translation (NAT) is the process of modifying network address information in datagram packet headers while in transit across a traffic routing device or gateway for the purpose of remapping a given address space into another. This process is very useful in building small private networks, as it allows all terminations to share a global routable IP (Internet Protocol) address. Terminations using this system can then intercommunicate using a private IP address realm, with the NAT gateway having a public address on its public-facing side.

The individual hosts behind the NAT gateway can still initiate connections with entities outside the gateway. However entities outside the gateway cannot initiate communications to individual host devices behind the gateway, as they do not have visibility of the private IP addresses behind the gateway.

In a Peer-to-Peer network, hosts behind a NAT gateway have to be reached directly for some purposes in order to communicate with other peers. However, NAT gateways hide individual hosts, so that peers are not reachable globally. This can be worked around by having the outside entity specify the public IP address of the NAT gateway, together with the identity of a port on the gateway, and for the NAT gateway to have a mapping of each port to a pre-specified internal private IP and port. However, this results in breaking common end-to-end connections. NAT technologies are not standardized so that the proliferation of NAT devices makes it difficult for peer-to-peer applications to inter-operate.

The present invention provides a system that allows reliable communication to be established with a termination served by an NAT gateway.

According to the invention there is provided a process for establishing communication between a server device connected to a network, and a client device connected to the server device through a gateway also connected to the network, wherein the gateway has associated therewith a router and a plurality of connection servers through which client devices may be connected to the gateway, and wherein each connection server reports its recent connections with respective client devices, and wherein when a connection request for a target client device is transmitted from the server to the router, the router requests connection history of the target device from each of the plurality of connection servers associated with the gateway, each connection server reporting its connection history respective to the target client device, and the router attempts communication with the client device through the connection server with the most recent connection.

In a preferred embodiment the router transmits an instruction to the client device to initiate a communication connection with the server device. This preserves the integrity of the gateway and ensures that, should the client device and connection server later become dissociated, the server device does not attempt to make connection with another client device subsequently associated with the same connection server.

Also in the preferred embodiment, the router transmits the connection request to more than one of the connection servers, each of the connection servers receiving the request transmits a response to the router to indicate whether the target client device is currently connected to that connection server, and the router updates the data in the store associated with the connection server, if any, to which the target client device is connected to provide updated data for that connection server.

In the preferred embodiment, the router selects one or more connection servers for the connection attempt, according to timestamp data identifying one or more of the most recent connections. When connection is made with one of the connection servers the time stamps associated with the other connection servers may be deleted or, particularly if no connection server reports connection to the target device, the timestamps may be retained as indicative of the likely location of the target device when next it goes on line.

6. The invention also extends to a network gateway for establishing connection between one or more client devices and a network connection, the gateway comprising a plurality of connection servers, a router, a transmitter, a store for storing data associated with each connection server relating to its respective recent connections to each of one or more client devices, and a receiver for receiving a request from the network connection for connection to a target client device, the router being responsive to such a connection request to request a connection history of the target device from each of the plurality of connection servers, each connection server reporting its connection history respective to the target client device, and the router being configured to attempt communication with the client device through the connection server with the most recently reported connection.

BRIEF DESCRIPTION OF THE DRAWINGS

An embodiment of the invention will now be described, by way of example, with reference to the Figures, in which.

DETAILED DESCRIPTION OF PRESENT EXAMPLE EMBODIMENTS

Figure 1:
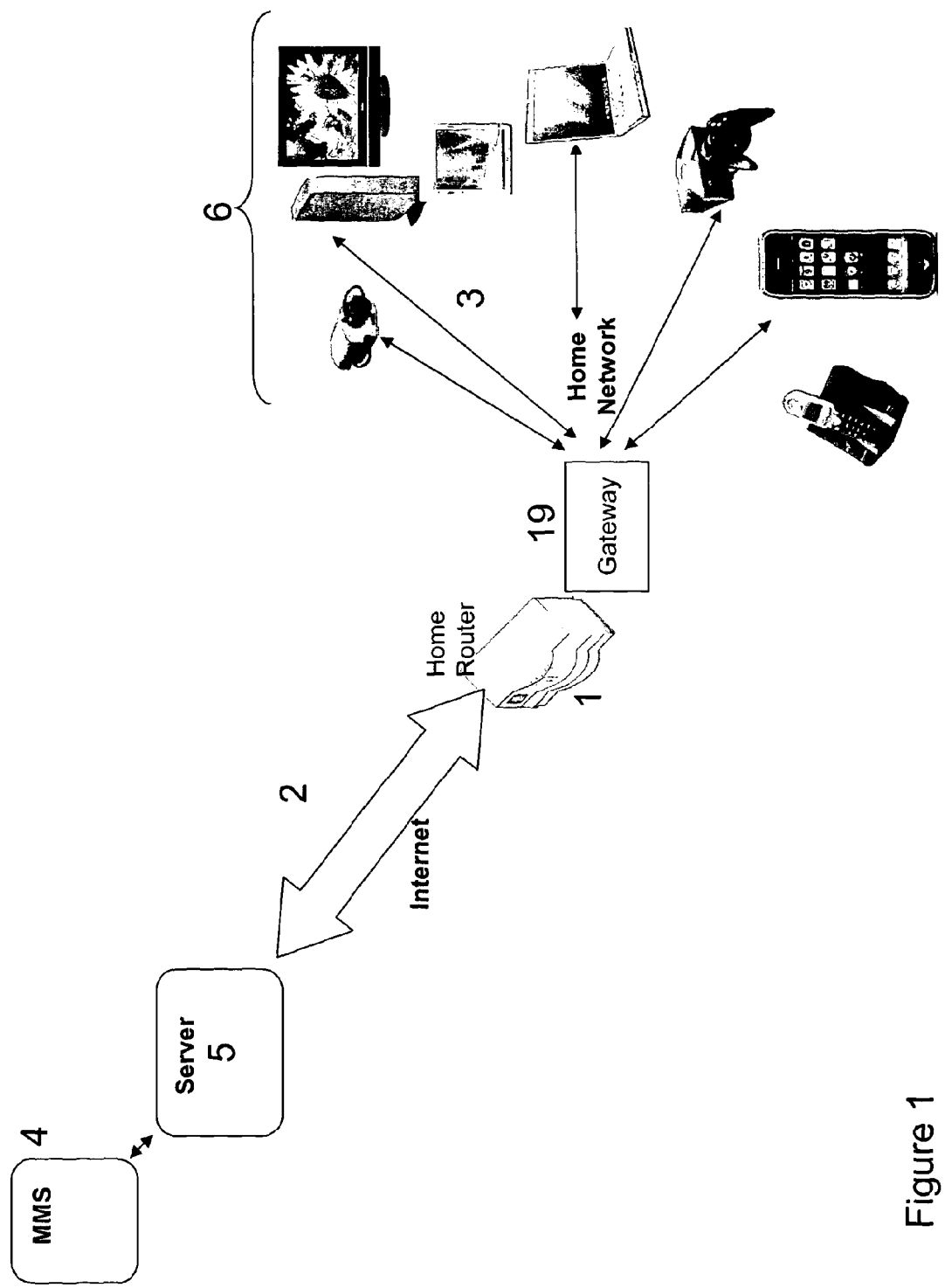
FIG. 1 is a schematic diagram illustrating the elements which co-operate to perform the invention

FIG. 1 depicts a router or "home hub" device 1 connected to a public data communications network 2 and, through a gateway application, to a private data communications network 3 such as a home wireless network. Through the public network 2 the access point can be connected to a wide variety of services, for example a multimedia messaging service (MMS) 4, which is depicted in FIG. 1 as being accessed through a messaging server 5. The private network 3 allows connection of a plurality of client devices 6.

The system will be described with reference to an MMS service, but other services which need to initiate contact with a user device, rather than having connection initiated from the user device itself, may operate with the invention in a similar way.

Figure 2:
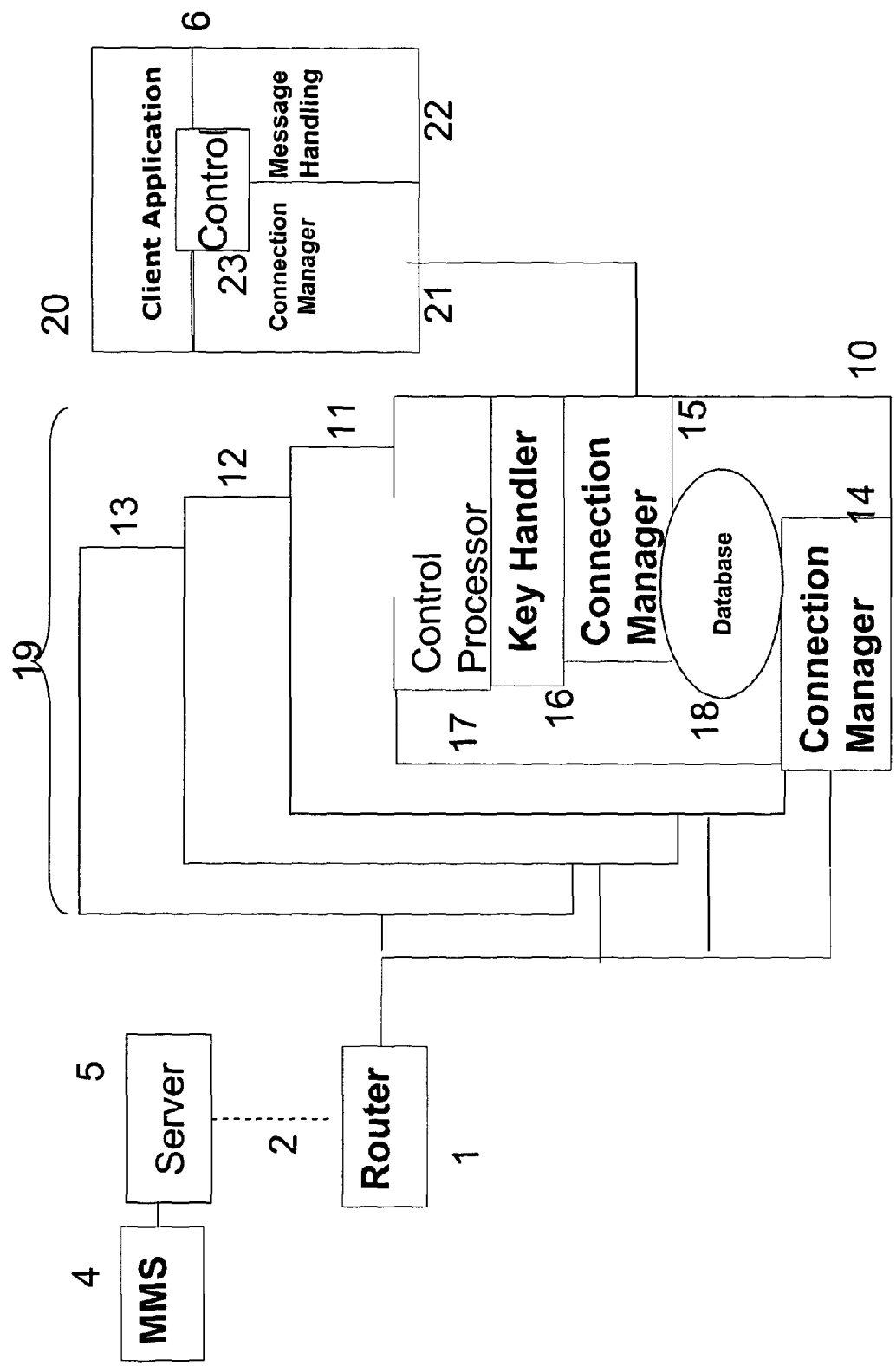
FIG. 2 is a schematic diagram illustrating the functional components of the gateway device depicted in FIG. 1

FIG. 2 illustrates the functional components of the router 1 and a client device 6. These include a plurality of connection servers 10, 11, 12, 13 to one of which is connected a client device 6, through a gateway 19. The gateway 19 is a networking device to allow user devices 6 access to the private network 3, using ethernet, Powerline or Wi-Fi to connect to the access point (router) 1 to use the internet services over the public network 2.

The connections between the router 1 and the user devices 6 are not permanent, but are established as and when the user devices require to transmit data, or requests for data, to the network. Moreover, an individual device 6 may connect to different connection servers 10, 11 at different times, according to their usage by other client devices, the physical location of access points, and the connection means, e.g. wireless, wired Ethernet, wireline, etc.

The functional elements 14, 15, 16, 17, 18, of one connection server 10 are depicted in FIG. 2, but it will be understood that the other connection servers 11, 12, 13 are similar. Each connection server comprises respective connection managers 14, 15 for handling communication with the network 2 and the user terminal device 6 respectively, a key-handling unit 16 to handle encryption, and a control processor 17 for co-ordinating the operation of the other elements 14, 15, 16. It also maintains a connection database 18, which includes a record of devices 6 which have recently connected to it, the port through which it was connected, and the time at which the connection was last reported. These records can be updated as connections are established or re-established. As will be seen, they can also be erased in response to a command from the router 1.

Each Connection Server 10, 11, 12, 13 has an in-memory database 18 to store connection information of user devices 6. When a device boots up, the client application 20 of the device connects to the connection server 10, 11 associated with the access point and gateway 19 through which it is connected. The connection information is retrieved from the device 6 and stored in the in-memory database 18.

The invention provides the means for the presence of an MMS message to be alerted to the target device 6, to cause the target device to establish contact with the MMS service 4 and retrieve the message.

Each device 6 has a unique identity registered in the router 1. This identity is used by the router 1 when an MMS server has a message to transmit to the device 6.

As also shown in FIG. 2, each user device 6 incorporates a client application 20, whose functionality is to register with the connection server 10. Such connection is made whenever communication is established or re-established with one or other of the connection servers 10, 11 etc in the private network 3. Connection may be by UPnP (Universal Plug and Play) protocol or TCP (transmission control protocol). In TCP, connection to the device is maintained over the private network. In UPnP connection is not maintained to the device, but connection information of the device is maintained in the database 18. When a 'Call Home' message is sent to the device 6, a TCP Connection server will use the existing connection to the device, but a UPnP connection server creates a new connection for the purpose, based on the connection information in the database, and uses that new connection.

The user device also includes connection management functionality 21 for establishing a communications connection through the private network 3 to the gateway 19, a message handling application 22 for generating outgoing messages and receiving incoming ones, and a control processor 23 for co-ordinating the operation of the other elements 20, 21, 22.

The user device 6 is set up to subscribe to an MMS server 4, with the subscription details to be held by the router 1, including a device-specific serial number to target the appropriate device 6. Note that this serial number does not include the address of the device in the private network, 3, as that is dynamic data which can change behind the router 1 without anything being apparent on the network side of the router 1.

Figure 3:
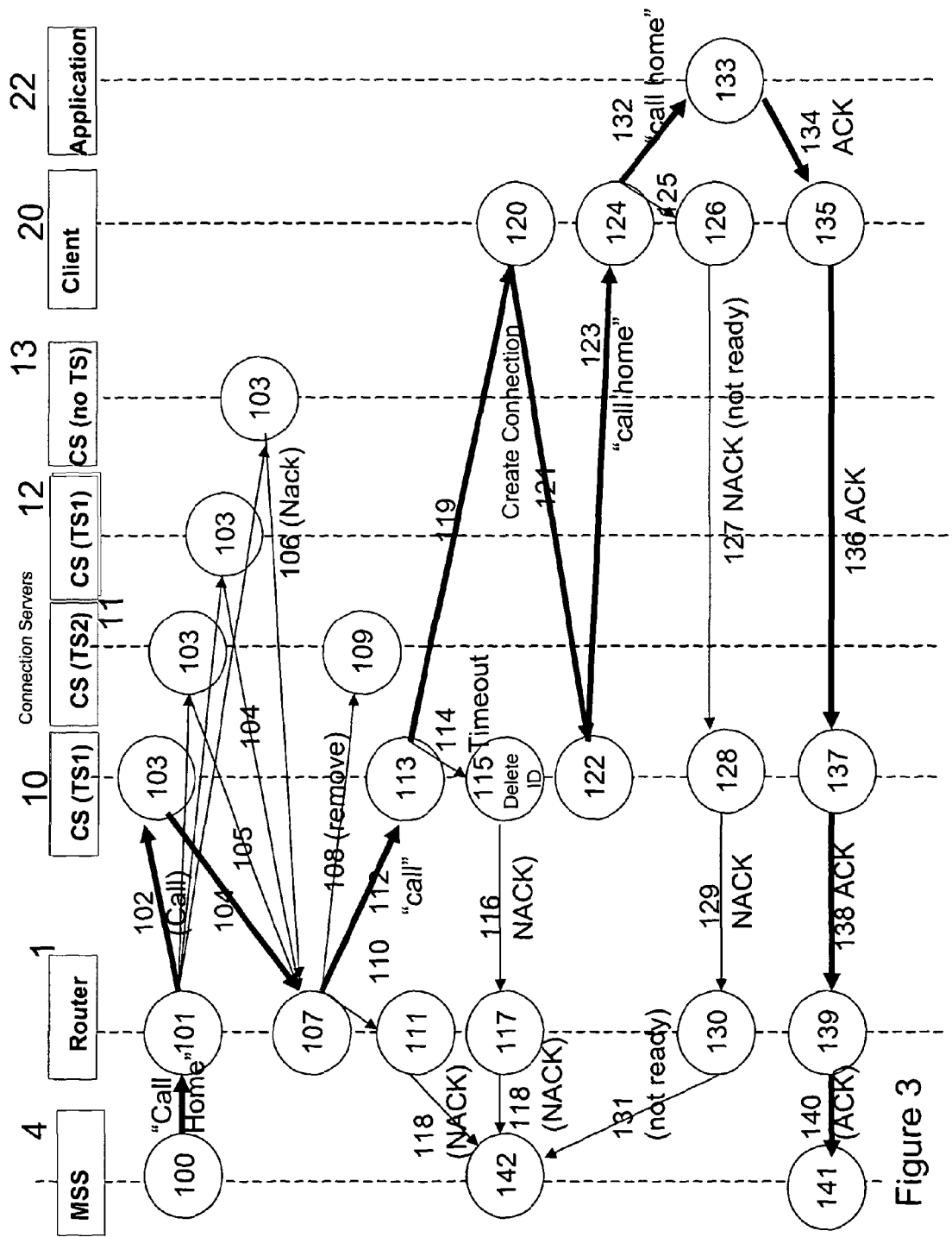
FIG. 3 is a schematic diagram illustrating the information flows taking place when a connections is to be established with a target client application in a user terminal.
Figure 4:
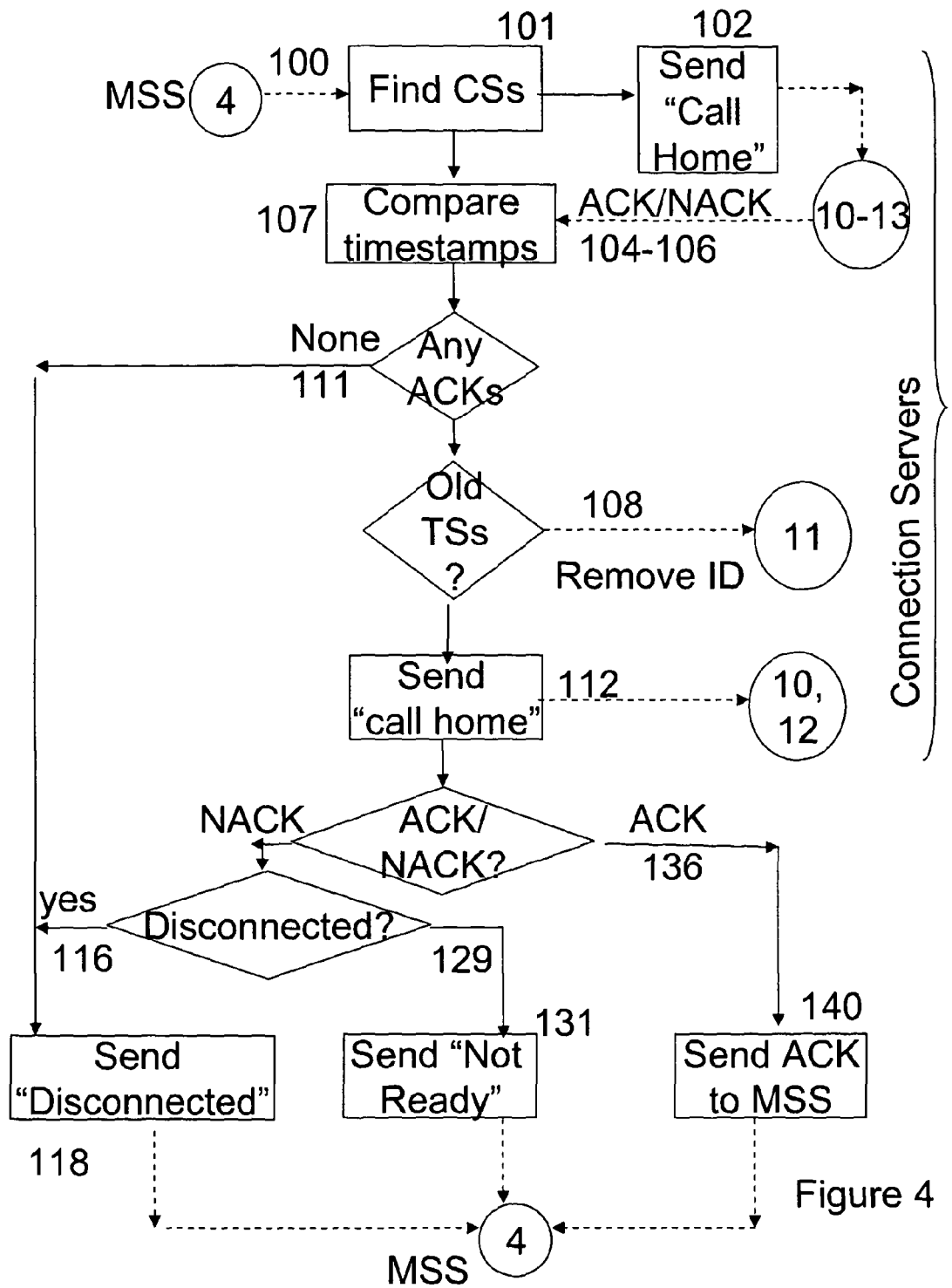
FIG. 4 is a flow chart illustrating the processes performed by the router.
Figure 5:
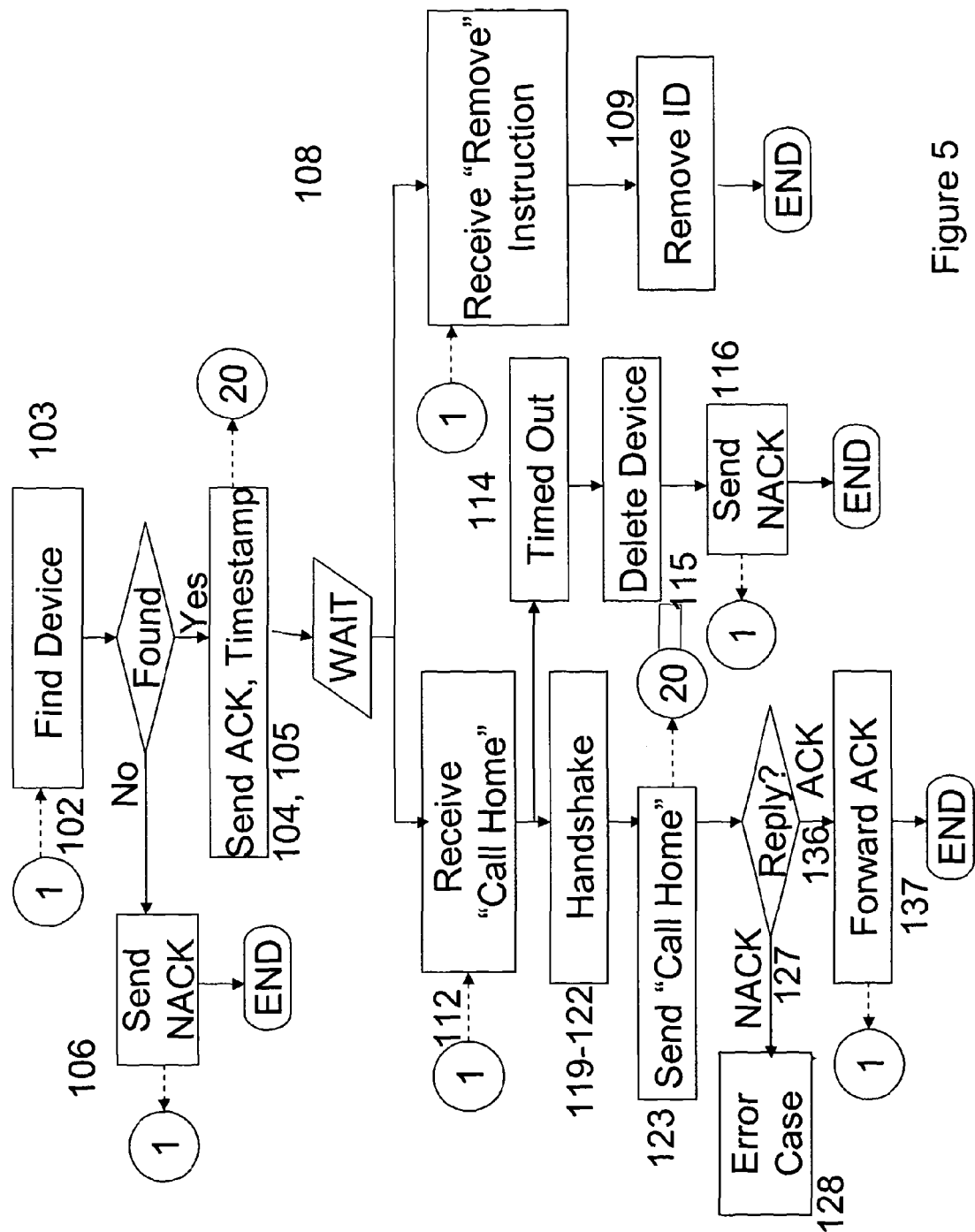
FIG. 5 is a flow chart illustrating the processes performed by one of the connection servers
Figure 6:
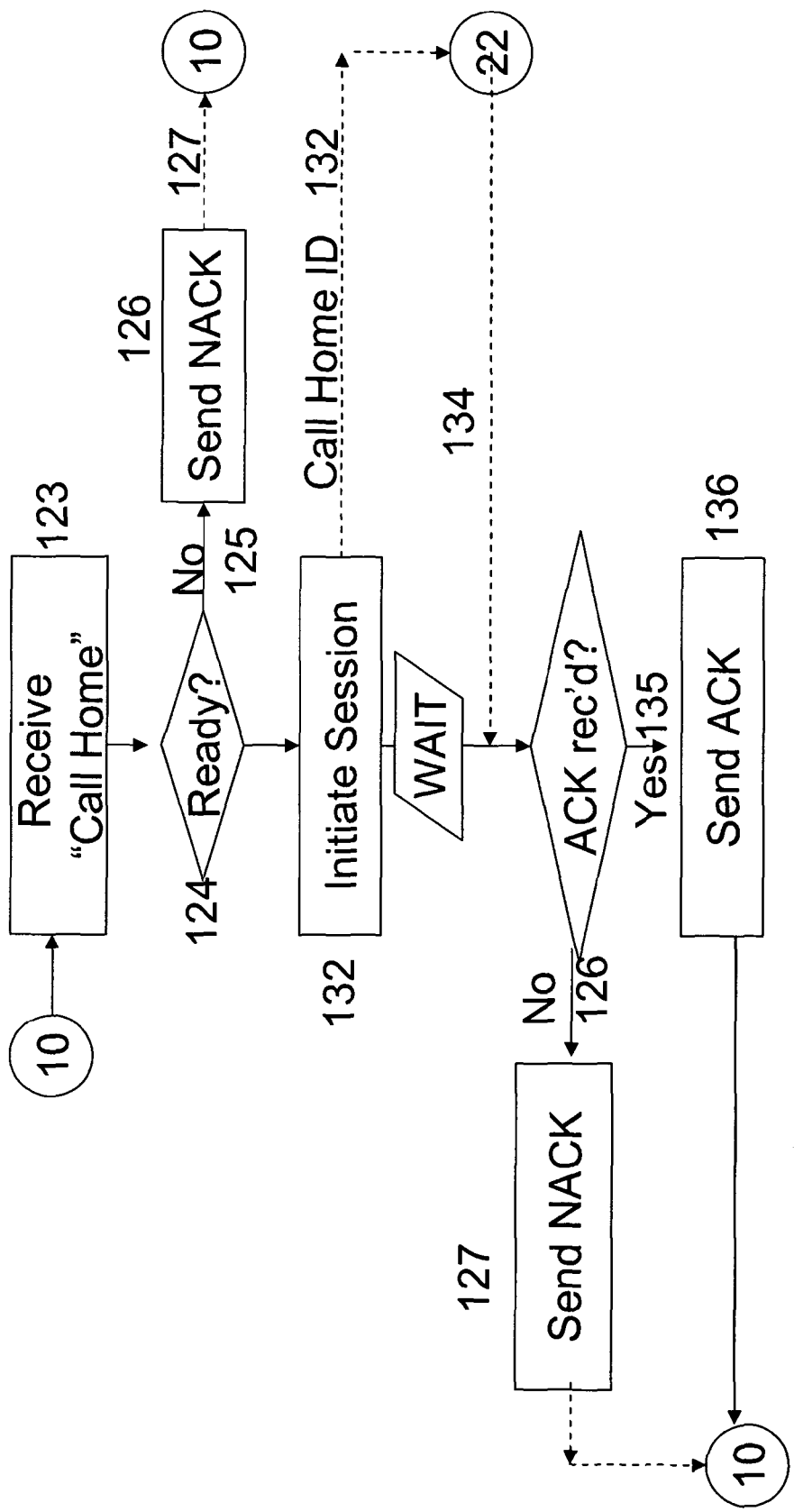
FIG. 6 is a flow chart illustrating the processes performed by the client application 20 in a user terminal

The operation of the system will now be described with reference to FIGS. 3 to 6. FIG. 3 is a sequence diagram illustrating the exchanges of data which take place when the MMS service 4 receives a datagram intended for a client device 6. The diagram is for a UpNP connection: the minor variations in process required for TCP operation will be discussed as they arise. It should be noted that the access point 1 may be running both types of connection simultaneously, with different terminals, or at different times with the same terminal. FIGS. 4, 5 and 6 are flow charts depicting the behaviour of the three principal co-operating applications, namely:

the router 1 (FIG. 4),
one of the connection servers 10, 11, 12, 13 (FIG. 5) and
the client application 20 running on the target user device 6 (FIG. 6).

As previously mentioned, the router 1 stores a device-specific serial number for each device 6 which has registered with it.

When an MMS server 4 or other external application needs to contact a device 6, the MMS sends a message 100 to the Router 1. This message incorporates data relating to Device Type, unique ID of the device, Application ID, unique request ID of the MMS and a 'Call Home' instruction. The Router 1 processes this message (step 101) and transmits a query 102 to all the connection servers 10, 11, 12, 13 to determine if any of the connection servers has contact information about the device. The query contains the device type and unique ID.

Each connection server performs a check (103) and any connection server 10, 11, 12 which has the same device type and unique ID recorded in its database 18 responds to the messaging server 5 with an acknowledgement ("ACK") and timestamp (104, 105) indicative of the time the device 6 last registered with the connection server. In FIG. 3, two connection servers 10, 12 have the same timestamp TS1, and return a first timestamp message 104, and a third connection server 101 has an earlier (older) timestamp TS2 and returns a different timestamp massage 105.

Any Connection Server 13 which does not have the required connection information of (device type, unique ID) returns a "NACK" (not acknowledged) signal 106 to the router 5.

The router 1 first checks whether any acknowledgements 104, 105 have been received (step 110). If it receives no timestamps from any of the connection servers 10, 11, 12, 13 (step 111) (i.e. all the replies are "NACK"s) it returns a 'device not connected' message 118 to the MMS server 4. The message can then be stored by the MMS server 4 (step 142) to await the next time the user device 6 logs in to the MMS service manually.

If the router 1 receives any acknowledgements it compares the replies (step 107) and determines which of the connection servers 10, 11, 12, 13 has returned a timestamp 104, 105 or, if there are more than one, the most recent timestamp 104. It then transmits a 'Call Home' message 112 to the connection server 10 so identified, for forwarding to the user device 6. The message 112 includes device type, unique ID of the device, Application ID, unique request ID of the MMS and the 'Call Home' message. This allows the user device 6 to initiate a session with the MMS server 4. If more than one connection server 10, 12 has the same timestamp, one of them is selected at random, or according to other criteria such as the amount of other activity the individual connection servers 10, 12 are carrying out.

The router 1 sends 'Remove Registration Info' message 108 to any connection server 11 which sent an ACK message 105 with an older timestamp, causing the connection server in question to delete the device 6 from its database 18. It will therefore respond to future requests for the device 6 with "NACK" 106. If the device 6 subsequently re-attaches to a connection server 11, 13 a new timestamp will be generated, which will be more recent than the existing timestamp TS1 and will thus take precedence in future connection attempts.

On receiving the "call Home" message 112, the selected connection server 10 processes the message. The connection server first checks whether the connection with the user terminal has timed out (step 113): that is to say that, notwithstanding that no other such server has a more recent timestamp for the terminal 6, the terminal itself has failed to respond to one or more periodic "heartbeat" signals from the connection server and has timed out. If it has timed out (114) the connection server deletes its record of the device (step 115) and returns a "not connected" message 116 to the router 1. The router then deletes the terminal's ID from the record associated with that connection server 10 (step 117) and returns a "device disconnected" message 118 to the MMS server 4. The message can then be stored by the MMS server 4 (step 142) until the user device 6 next logs in to the MMS service manually.

If the terminal 6 has not timed out (step 113), the "call home" message can be forwarded to it (step 123). However, if the user device 6 communicates with the connection server 10 using UPnP or other "as required" protocol, a connection first needs to be established, so a handshake process 119, 120, 121,122 is performed between the connection server 10 and the user terminal 6. In this handshake, a connection creation instruction 119 is sent to the terminal 6, which changes to a "connected" state 120 and transmits a response 121, which causes the connection server 10 to change its own status 122 to "connected". These steps 119-122 are not required if a "long lived" protocol such as TCP is used.

The "call home" message 123 is now sent to the client application 20 running on the user terminal 6. This message includes the Application ID, unique request ID of the MMS and the 'Call Home' message. The client application 20 assesses the message (124). If it is not able to connect (state 125) it generates an error message (step 126) and transmits a NACK response 127 for transmission to the connection server 10. The connection server performs an error management process 128, which may involve reattempts or other remedial action, and if this is not successful transmits an "application not ready" message 129 back to the router 1. The router also performs an error management process 130, which may involve attempting connection through another connection server 12, and if unsuccessful transmits an "application not ready" message 131 back to the MMS server 4. The message can then be stored by the MMS server 4 (step 142) until the user device 6 next logs in to the MMS service manually.

In the event that the user device is able to connect (state 132) the messaging application 22 in the user terminal 6 is activated (step 133) and responds with an acknowledgement 134. The client application 20 establishes the connection (step 135) and forwards an acknowledgement (136) to the connection server 10 which itself responds (step 137) by forwarding the acknowledgement 138 to the router 1, which in its turn also forwards an acknowledgement 140 to the MMS platform 4. The application 22 can now open a communications session with the MMS platform 4 (step 141).

What is claimed is:

1. A process for establishing communication between a server device connected to a network, and a client device connected to the server device through a gateway also connected to the network, wherein the gateway has associated therewith a router and a plurality of connection servers through which client devices may be connected to the gateway, and wherein each connection server reports its recent connections with respective client devices, and wherein when a connection request for a target client device is transmitted from the server to the router, the router requests connection history of the target device from each of the plurality of connection servers associated with the gateway, each connection server reporting its connection history respective to the target client device, and the router attempts communication with the client device through the connection server with the most recent connection.

2. The process according to claim 1, in which the router transmits an instruction to the client device to initiate a communication connection with the server device.

3. The process according to claim 1, in which:
    the router transmits the connection request to more than one of the connection servers,
    each of the connection servers receiving the request transmits a response to the router to indicate whether the target client device is currently connected to that connection server, and
    the router updates the data in the store associated with the connection server, if any, to which the target client device is currently connected to provide updated data for that connection server.

4. The process according to claim 3, in which the router selects one or more connection servers for the connection attempt, according to timestamp data identifying one or more of the most recent connections.

5. The process according to claim 4, wherein when connection is made with one of the connection servers the time stamps associated with the other connection servers are deleted.

6. A process for establishing communication between a server device connected to a network, and a client device connected to the server device through a gateway also connected to the network, wherein the gateway has associated therewith a router and a plurality of connection servers through which client devices may be connected to the gateway, and wherein each connection server reports its recent connections with respective client devices, and wherein when a connection request for a target client device is transmitted from the server to the router, the router requests connection history of the target device from each of the plurality of connection servers associated with the gateway, each connection server reporting its connection history respective to the target client device, and the router attempts communication with the client device through the connection server with the most recent connection, in which:
  the router transmits the connection request to more than one of the connection servers,
  each of the connection servers receiving the request transmits a response to the router to indicate whether the target client device is currently connected to that connection server,
  the router updates the data in the store associated with the connection server, if any, to which the target client device is currently connected to provide updated data for that connection server,
  the router selects one or more connection servers for the connection attempt, according to timestamp data identifying one or more of the most recent connections, and
  if no connection server reports connection to the target device, the timestamps are retained as indicative of the likely location of the target device when next it goes on line.

7. A network gateway for establishing connection between one or more client devices and a network connection, the gateway comprising a plurality of connection servers, a router, a transmitter, a store for storing data associated with each connection server relating to its respective recent connections to each of one or more client devices, and a receiver for receiving a request from the network connection for connection to a target client device,
  the router being responsive to such a connection request to request a connection history of the target device from each of the plurality of connection servers, each connection server including a computer processor and each connection server reporting its connection history respective to the target client device, and the router being configured to attempt communication with the client device through the connection server with the most recently reported connection.

8. The network gateway according to claim 7, in which the router is configured to generate an instruction to a target client device to initiate a communication connection with a server device through the network connection.

9. The network gateway according to claim 7, in which:
  the router is arranged to transmit the connection request to more than one of the connection servers,
  the connection servers are configured to respond to such a request by generating a response for transmission to the router to indicate whether the target client device is currently connected to that connection server, and
  the router is configured to update the data in the store associated with the connection servers, in accordance with the said responses.

10. The network gateway according to claim 9, in which the connection servers have timers to record the time of connection of a client device to the connection server, and the response generate by each connection server includes timestamp data indicative of the recorded time of connection, and wherein the router is configured to select one or more of the connection servers for a connection attempt, according to the timestamp data received from the connection servers.

11. The network gateway according to claim 10, wherein the router has a comparator to compare the timestamp data received from a plurality of connection servers, a selector to identify one or more of the connection servers having the most recent time stamp data, a signal generator for generating a timestamp deletion signal, and a transmitter for transmitting the deletion signal to one or more connection servers not selected by the selector.

12. A network gateway for establishing connection between one or more client devices and a network connection, the gateway comprising a plurality of connection servers, a router, a transmitter, a store for storing data associated with each connection server relating to its respective recent connections to each of one or more client devices, and a receiver for receiving a request from the network connection for connection to a target client device,
  the router being responsive to such a connection request to request a connection history of the target device from each of the plurality of connection servers, each connection server including computer processor and each connection server reporting its connection history respective to the target client device, and the router being configured to attempt communication with the client device through the connection server with the most recently reported connection, in which the router is configured to generate an instruction to a target client device to initiate a communication connection with a server device through the network connection, in which:
the router is arranged to transmit the connection request to more than one of the connection servers,
the connection servers are configured to respond to such a request by generating a response for transmission to the router to indicate whether the target client device is currently connected to that connection server,
the router is configured to update the data in the store associated with the connection servers, in accordance with the said responses,
the connection servers have timers to record the time of connection of a client device to the connection server, and the response generate by each connection server includes timestamp data indicative of the recorded time of connection, and wherein the router is configured to select one or more of the connection servers for a connection attempt, according to the timestamp data received from the connection servers, and
the router selects one or more connection servers for the connection attempt, according to timestamp data identifying one or more of the most recent connections, and if no connection server reports connection to the target device, the timestamps are retained as indicative of the likely location of the target device when next it goes on line.

* * * * *